(12) United States Patent
Bouchard

(10) Patent No.: US 9,600,092 B2
(45) Date of Patent: Mar. 21, 2017

(54) E-BOOK PAGE TURNING ACCESSORY

(71) Applicant: Andre Bouchard, Peabody, MA (US)

(72) Inventor: Andre Bouchard, Peabody, MA (US)

( * ) Notice: Subject to any disclaimer, the term of this patent is extended or adjusted under 35 U.S.C. 154(b) by 0 days.

(21) Appl. No.: 14/024,305

(22) Filed: Sep. 11, 2013

(65) Prior Publication Data

US 2015/0070329 A1  Mar. 12, 2015

(51) Int. Cl.
*G06F 3/0354* (2013.01)
*G06F 3/039* (2013.01)
*G06F 3/0488* (2013.01)

(52) U.S. Cl.
CPC .......... *G06F 3/03545* (2013.01); *G06F 3/039* (2013.01); *G06F 3/04886* (2013.01)

(58) Field of Classification Search
CPC ........ G06F 3/01; G06F 3/041; G06F 3/03545; H01H 3/00; H04N 5/232; G03B 17/00; G03B 17/38
USPC .................. 345/156, 173; 200/331; 455/557; 396/58; 222/174
See application file for complete search history.

(56) References Cited

U.S. PATENT DOCUMENTS

| 5,281,988 A * | 1/1994 | Martin ................... G03B 17/38 396/265 |
| 6,706,984 B1 * | 3/2004 | Turner ......................... 200/331 |
| 8,378,979 B2 | 2/2013 | Frid et al. |
| 8,432,356 B2 | 4/2013 | Chase |
| 2010/0202769 A1 * | 8/2010 | Polster ................... G03B 17/38 396/420 |
| 2012/0001844 A1 * | 1/2012 | Auguste et al. .............. 345/156 |
| 2013/0093702 A1 * | 4/2013 | Argiro ........................... 345/173 |

* cited by examiner

*Primary Examiner* — Lun-Yi Lao
*Assistant Examiner* — Johny Lau
(74) *Attorney, Agent, or Firm* — Daniel N. Smith

(57) ABSTRACT

An accessory device for e-reader devices that allows a user to turn pages on the electronic book without having to touch the e-reader device with hands or fingers. The accessory includes a clip that attaches to the front periphery of the e-reader device, with an electrically conductive tip end or soft-tip end that engages the page-turning surface of the e-reader device. The electrically conductive tip end or soft-tip end is operated by a finger push button on the other end of a cable release.

15 Claims, 18 Drawing Sheets

E-BOOK PAGE TURNING ACCESSORY

FIELD OF THE INVENTION

The field of the invention relates to an accessory device for e-readers that allows a user to turn electronic book pages without the need for hands or fingers to touch the E-reader thereby reducing fatigue.

BACKGROUND OF INVENTION

Ever since people began reading books, very few innovative ideas have been offered to make the mechanics of the reading experience easier. For instance, most books still have to be held by both hands for stabilization purposes, and to prevent inadvertent flipping of pages.

Reading books with many pages has often caused readers to become not only arm weary, but sometimes have thoughts interrupted while flipping pages especially for elderly or disabled people who lack the manual dexterity to flip pages quickly. An ultimate reading experience would probably be one where book pages never had to be turned with your hands or fingers.

In more recent years, a whole new revolution in book reading has occurred. This has been made possible with the advent of what is commonly known as E-readers. These mobile devices are designed for the purpose of reading digitally formatted books and periodicals. A single E-book has enough memory to hold the equivalent of hundreds, if not thousands of printed books with no additional weight or size. The E-book designs optimize book collection portability. Many E-book designs also contain special screens that optimize readability even in bright daylight.

Another advantage offered by E-readers over the old state of the art, is that of book page turning. A reader may turn a page by simply depressing a button on some E-reader models or touching a designated area of a touch screen on other models.

While there is no question that E-readers have greatly advanced the state of the art, they nevertheless have drawbacks, namely:

1) E-readers are designed to be cradled in one hand, with the other hand used for stabilization purposes as well as for pressing a button or tapping a touch screen to flip book pages. Anyone holding these E-readers, of not negligible weight, who is a serious reader will experience not only hand fatigue, but arm fatigue. This is the reason why E-reader manufacturers struggle to make E-reader devices even lighter in weight. This hand and arm fatigue deters from an enjoyable reading experience. Unfortunately, no two persons have the same size hands. Certainly a person with larger hands would feel more comfortable cradling an E-reader device than a child or elderly person, who may not be able to cradle the device in their hands, making their reading experiences much less enjoyable.

2) Another disadvantage of E-reader devices is that the page turning function requires the use of hands and fingers to blindly search out for the designated areas or buttons to turn the page. Not only is this annoying and tiresome to the reader, but it can result in false or inadvertent page turnings.

3) A further disadvantage of E-reader devices is that many elderly people with neurological illnesses would find it difficult to avoid accidental page turnings.

4) For those readers using an E-reader with a touch screen, the repetitive finger screen contacts to flip pages will cause smudging and dirtying of the screen.

For this and other reasons, the subject invention is intended to mitigate some of the displeasures experienced by using an E-reader device.

The subject invention is an E-reader accessory device that allows a reader to turn pages on any E-reader such that the hands or fingers never touch the E-reader.

SUMMARY OF THE INVENTION

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The subject invention discloses is an e-reader accessory device that allows a user to turn electronic pages such that the hands or fingers never touch the e-reader, the accessory device comprising: an elongated structure with a proximal end and a distal end, wherein the proximal end further comprises a handle operatively coupled with an axially displaceably mounted finger push rod, wherein the finger push rod is operatively coupled to a flexible, elongated, mechanical power-transmitting member, wherein a distal end of the power-transmitting member is attached to an end effector; a clip comprising a top portion attached to a front periphery surface of the e-reader over a page turning button and bottom portion attached to a back surface of the e-reader, wherein the clip is further attached about the end effector on the distal end of the power transmitting member; and wherein the accessory device turns pages on the e-reader by depressing the finger push rod so as to actuate the power transmitting member through the threaded connector aperture so as to displace the end effector onto the page-turning button.

A further embodiment of the subject invention is an e-reader accessory device that allows a user to turn electronic pages such that the hands or fingers never touch the e-reader, the accessory device comprising: an elongated structure with a proximal end and a distal end, wherein the proximal end further comprises a handle operatively coupled with an axially displaceably mounted finger push rod, wherein the finger push rod is operatively coupled to a flexible, elongated, mechanical power-transmitting member, wherein a distal end of the power-transmitting member is attached to an end effector; a clip comprising a top portion with a bottom surface and a bottom portion with a top surface, wherein the clip is attached about the end effector on the distal end of the power transmitting member, further wherein the clip comprises a spring loaded rotatable connection pivot that provides opposing rotatable forces on the top portion and the bottom portion, wherein these opposing rotatable forces compress and frictionally engage the bottom surface of the top portion with a front periphery surface of the e-reader over a page turning button, and the top surface of the bottom portion with a back surface of the e-reader; wherein the accessory device turns pages on the e-reader by depressing the finger push rod so as to actuate the power transmitting member through the threaded connector aperture so as to displace the end effector onto the page-turning button.

Another embodiment of the subject invention is an e-reader accessory device that allows a user to turn electronic pages such that the hands or fingers never touch the e-reader, the accessory device comprising: an elongated structure with a proximal end and a distal end, wherein the proximal end further comprises a handle operatively coupled with an axially displaceably mounted finger push rod, wherein the finger push rod is operatively coupled to a flexible, elongated, mechanical power-transmitting member, wherein a distal end of the power-transmitting member is attached to an end effector; a clip comprising a top portion with a bottom surface and a bottom portion with a top surface, wherein the clip is attached about the end effector on the distal end of the power transmitting member, further wherein the clip comprises two opposing legs that transfer energy that forces the clip against the e-reader bezel when flexed over the bezel; wherein the accessory device turns pages on the e-reader by depressing the finger push rod so as to actuate the power transmitting member through the threaded connector aperture so as to displace the end effector onto the page-turning button.

Another embodiment of the subject invention is an e-reader accessory device that allows a user to turn electronic pages such that the hands or fingers never touch the e-reader, the accessory device comprising: an elongated structure with a proximal end and a distal end, wherein the proximal end further comprises a handle operatively coupled with an axially displaceably mounted finger push rod, wherein the finger push rod is operatively coupled to a flexible, elongated, mechanical power-transmitting member, wherein a distal end of the power-transmitting member is attached to an end effector; a clip comprising a top portion with a bottom surface and a bottom portion with a top surface, wherein the clip is attached about the end effector on the distal end of the power transmitting member, further wherein the clip comprises two opposing legs that provide opposing rotatable forces on the top portion and the bottom portion, wherein these opposing rotatable forces compress and frictionally engage the bottom surface of the top portion with a front periphery surface of the e-reader over a page turning button, and the top surface of the bottom portion with a back surface of the e-reader; wherein the accessory device turns pages on the e-reader by depressing the finger push rod so as to actuate the power transmitting member through the threaded connector aperture so as to displace the end effector onto the page-turning button.

A further embodiment of the subject invention is an e-reader accessory device that allows a user to turn electronic pages such that the hands or fingers never touch the e-reader, the accessory device comprising: an elongated structure with a proximal end and a distal end, wherein the proximal end further comprises a handle operatively coupled with an axially displaceably mounted finger push rod, wherein the finger push rod is operatively coupled to a flexible, elongated, mechanical power-transmitting member, wherein a distal end of the power-transmitting member is attached to an end effector; a clip comprising a top portion with a bottom surface and a bottom portion with a top surface, wherein the clip is attached about the end effector on the distal end of the power transmitting member, further wherein the clip comprises a spring loaded rotatable connection pivot that provides opposing rotatable forces on the top portion and the bottom portion, wherein these opposing rotatable forces compress and frictionally engage the bottom surface of the top portion with a front periphery surface of the e-reader device over a touch sensitive page turning area on an e-reader display screen, and the top surface of the bottom portion with a back surface of the e-reader; wherein the e-reader accessory device turns pages on the e-reader by depressing the finger push rod so as to cause the conductive end of the end effector on the distal end of the power transmitting member to touch the e-reader screen and alter the capacitance at the touch point, thereby sending a signal to the e-reader to actuate a page turn on the e-reader screen.

An even further embodiment of the subject invention is an e-reader accessory device that allows a user to turn electronic pages such that the hands or fingers never touch the e-reader, the accessory device comprising: an elongated structure with a proximal end and a distal end, wherein the proximal end further comprises a handle operatively coupled with an axially displaceably mounted finger push rod, wherein the finger push rod is operatively coupled to a flexible, elongated, mechanical power-transmitting member, wherein a distal end of the power-transmitting member is attached to an end effector; a clip comprising a top portion with a bottom surface and a bottom portion with a top surface, wherein the clip is attached about the end effector on the distal end of the power transmitting member, further wherein the clip comprises two opposing legs that transfer energy that forces the clip against the e-reader bezel when flexed over the bezel; wherein the e-reader accessory device turns pages on the e-reader by depressing the finger push rod so as to cause the conductive end of the end effector on the distal end of the power transmitting member to touch the e-reader screen and alter the capacitance at the touch point, thereby sending a signal to the e-reader to actuate a page turn on the e-reader screen.

A further embodiment of the subject invention is an e-reader accessory device that allows a user to turn electronic pages such that the hands or fingers never touch the e-reader, the accessory device comprising: an elongated structure with a proximal end and a distal end, wherein the proximal end further comprises a handle operatively coupled with an axially displaceably mounted finger push rod, wherein the finger push rod is operatively coupled to a flexible, elongated, mechanical power-transmitting member, wherein a distal end of the power-transmitting member is attached to an end effector; a clip comprising a top portion with a bottom surface and a bottom portion with a top surface, wherein the clip is attached about the end effector on the distal end of the power transmitting member, further wherein the clip comprises two opposing legs that provide opposing rotatable forces on the top portion and the bottom portion, wherein these opposing rotatable forces compress and frictionally engage the bottom surface of the top portion with a front periphery surface of the e-reader over a page turning button, and the top surface of the bottom portion with a back surface of the e-reader; wherein the e-reader accessory device turns pages on the e-reader by depressing the finger push rod so as to cause the conductive end of the end effector on the distal end of the power transmitting member to touch the e-reader screen and alter the capacitance at the touch point, thereby sending a signal to the e-reader to actuate a page turn on the e-reader screen.

Another embodiment of the subject invention is an e-reader accessory device that allows a user to turn electronic pages such that the hands or fingers never touch the e-reader, the accessory device comprising: an elongated structure with a proximal end and a distal end, wherein the proximal end further comprises a handle operatively coupled with an axially displaceably mounted finger push rod, wherein the finger push rod is operatively coupled to a flexible, elongated, mechanical power-transmitting member, wherein a distal end of the power-transmitting member is attached to a conductive stylus; a clip comprising a top portion with a bottom surface and a bottom portion with a top surface, wherein the clip is attached about the stylus on the distal end of the power transmitting member, further wherein the clip comprises a spring loaded rotatable connection pivot that provides opposing rotatable forces on the top portion and the bottom portion, wherein these opposing rotatable forces compress and frictionally engage the bottom surface of the top portion with a front periphery surface of the e-reader device over a touch sensitive page turning area on an e-reader display screen, and the top surface of the bottom portion with a back surface of the e-reader; wherein the e-reader accessory device turns pages on the e-reader by depressing the finger push rod so as to cause the conductive stylus tip on the distal end of the power transmitting member to touch the e-reader screen and alter the capacitance at the touch point, thereby sending a signal to the e-reader to actuate a page turn on the e-reader screen.

A further embodiment of the subject invention is an e-reader accessory device that allows a user to turn electronic pages such that the hands or fingers never touch the e-reader, the accessory device comprising: an elongated structure with a proximal end and a distal end, wherein the proximal end further comprises a handle operatively coupled with an axially displaceably mounted finger push rod, wherein the finger push rod is operatively coupled to a flexible, elongated, mechanical power-transmitting member, wherein a distal end of the power-transmitting member is attached to a conductive stylus; a clip comprising a top portion with a bottom surface and a bottom portion with a top surface, wherein the clip is attached about the stylus on the distal end of the power transmitting member, further wherein the clip comprises two opposing legs that transfer energy that forces the clip against the e-reader bezel when flexed over the bezel; wherein the e-reader accessory device turns pages on the e-reader by depressing the finger push rod so as to cause the conductive tip on the distal end of the power transmitting member to touch the e-reader screen and alter the capacitance at the touch point, thereby sending a signal to the e-reader to actuate a page turn on the e-reader screen.

A further embodiment of the subject invention is an e-reader accessory device that allows a user to turn electronic pages such that the hands or fingers never touch the e-reader, the accessory device comprising: an elongated structure with a proximal end and a distal end, wherein the proximal end further comprises a handle operatively coupled with an axially displaceably mounted finger push rod, wherein the finger push rod is operatively coupled to a flexible, elongated, mechanical power-transmitting member, wherein a distal end of the power-transmitting member is attached to a conductive stylus; a clip comprising a top portion with a bottom surface and a bottom portion with a top surface, wherein the clip is attached about the stylus on the distal end of the power transmitting member, further wherein the clip comprises two opposing legs that provide opposing rotatable forces on the top portion and the bottom portion, wherein these opposing rotatable forces compress and frictionally engage the bottom surface of the top portion with a front periphery surface of the e-reader over a page turning button, and the top surface of the bottom portion with a back surface of the e-reader; wherein the e-reader accessory device turns pages on the e-reader by depressing the finger push rod so as to cause the conductive tip on the distal end of the power transmitting member to touch the e-reader screen and alter the capacitance at the touch point, thereby sending a signal to the e-reader to actuate a page turn on the e-reader screen.

In embodiments of the subject invention, the end effector may comprise a soft rubber tip. In further embodiments of the subject invention, the end effector may comprise an electrically conductive material selected from the group consisting of a conductive rubber contact pad button, a capacitive stylus end, a conductive metal mesh, a conductive sponge, a conductive rubber cording, or a metal disk.

In embodiments of the subject invention, the clip may be composed of plastic or metal.

In other embodiments of the subject invention, the end effector may comprise a conductive tip that does not scratch the e-reader display screen.

In further embodiments of the subject invention, the opposing rotatable forces may be strong enough to maintain the clip frictionally engaged with the e-reader device with substantially no movement, but weak enough to substantially prevent any scratching to the front periphery surface of the e-reader device.

In other embodiments of the subject invention, the end effector may have a displacement of ⅛ to ¼ inches.

In other embodiments of the subject invention, the end effector may have a diameter of ⅛ to ¼ inches.

In further embodiments of the subject invention, the accessory device may further comprise a mechanical stop that substantially prevents excess displacement of the end effector against the e-reader device page turning button.

In other embodiments of the subject invention, the finger push rod, the handle, the power transmitting means, the clip, and the end effector may comprise integral components of the e-reader device.

In other embodiments of the subject invention, the e-reader device may comprise any suitable handheld computing device configured to read e-books.

In embodiments of the subject invention, the e-reader device display screen may comprise a display selected from the group consisting of a liquid crystal display (LCD), a light-emitting diode (LED) display, an e-ink display, or a surface-conduction electro-emitter display (SED).

In further embodiments of the subject invention, the touch sensitive page turning area may comprise a touch sensitive display selected from the group consisting of a near field-sensitive, a capacitive, an acoustically-sensitive, or a photo-sensitive display.

In embodiments of the subject invention, the term "substantially" is defined as at least close to (and can include) a given value or state, as understood by a person of ordinary skill in the art. In one embodiment, the term "substantially" refers to ranges within 10%, preferably within 5%, more preferably within 1%, and most preferably within 0.1% of the given value or state being specified.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto. These together with other objects of the invention, along with the various features of novelty, which characterize the invention, are pointed out with particularity in the claims annexed to and forming a part of this disclosure.

BRIEF DESCRIPTION OF THE DRAWINGS

Advantages of the present invention will be apparent from the following detailed description of exemplary embodiments thereof, which description should be considered in conjunction with the accompanying drawings.

DETAILED DESCRIPTION OF EMBODIMENTS

The following will describe, in detail, several embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

For a conceptual understanding of the invention and its operational advantages, refer to the accompanying drawings and descriptive matter in which there are preferred embodiments of the invention illustrated. Other features and advantages of the present invention will become apparent from the following description of the preferred embodiment(s), taken in conjunction with the accompanying drawings, which by way of example; illustrate the principles of the invention.

The subject invention is an e-reader accessory device 1 that allows a user to turn electronic pages on an e-reader device 2 such that the hands or fingers never touch the e-reader device 2.

In embodiments of the subject invention, the terms "e-reader device" and "e-reader" may refer to any suitable computing device configured to read e-books. In embodiments of the subject invention, an e-reader device 2 may include a "dedicated e-reader" (e.g., a Kindle® or a Nook®), a Smartphone, a tablet computer, a laptop computer, or a personal computer, implementing one or more software applications that allow the device to read e-books.

In embodiments of the subject invention, the terms "book" or "e-book" may refer to any publication published in electronic/digital form. This may include the electronic forms of books, magazines, newspapers, or any other publications.

FIGS. 1-4 illustrate exemplary e-reader devices 2 that may implement the e-reader accessory device 1. The e-reader device 2 may be configured to present text, images, and/or other content from an e-book onto a display screen 3.

Figure 1:
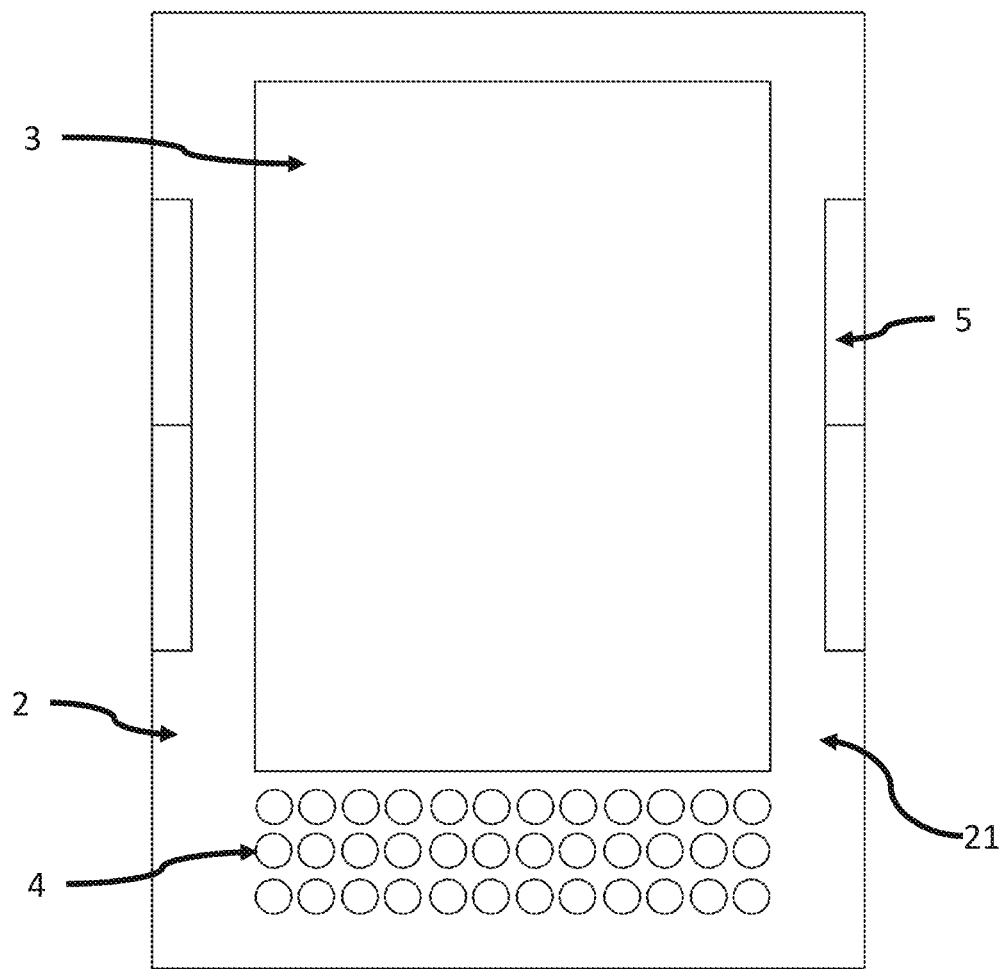
FIG. 1 is a front view of one embodiment of an exemplary dedicated e-ink e-reader with a keyboard.

The e-reader devices 2 of FIGS. 1-4 have buttons 4, 5, and 6 to allow a user to interact with the devices 2. FIG. 1 illustrates a dedicated e-reader device 2 with a QWERTY keyboard 4 and an e-ink display screen 3. The e-reader device 2 of FIG. 1 further contains page-turning buttons 5. A user depresses these buttons 5 to move the pages of an e-book.

Figure 2:
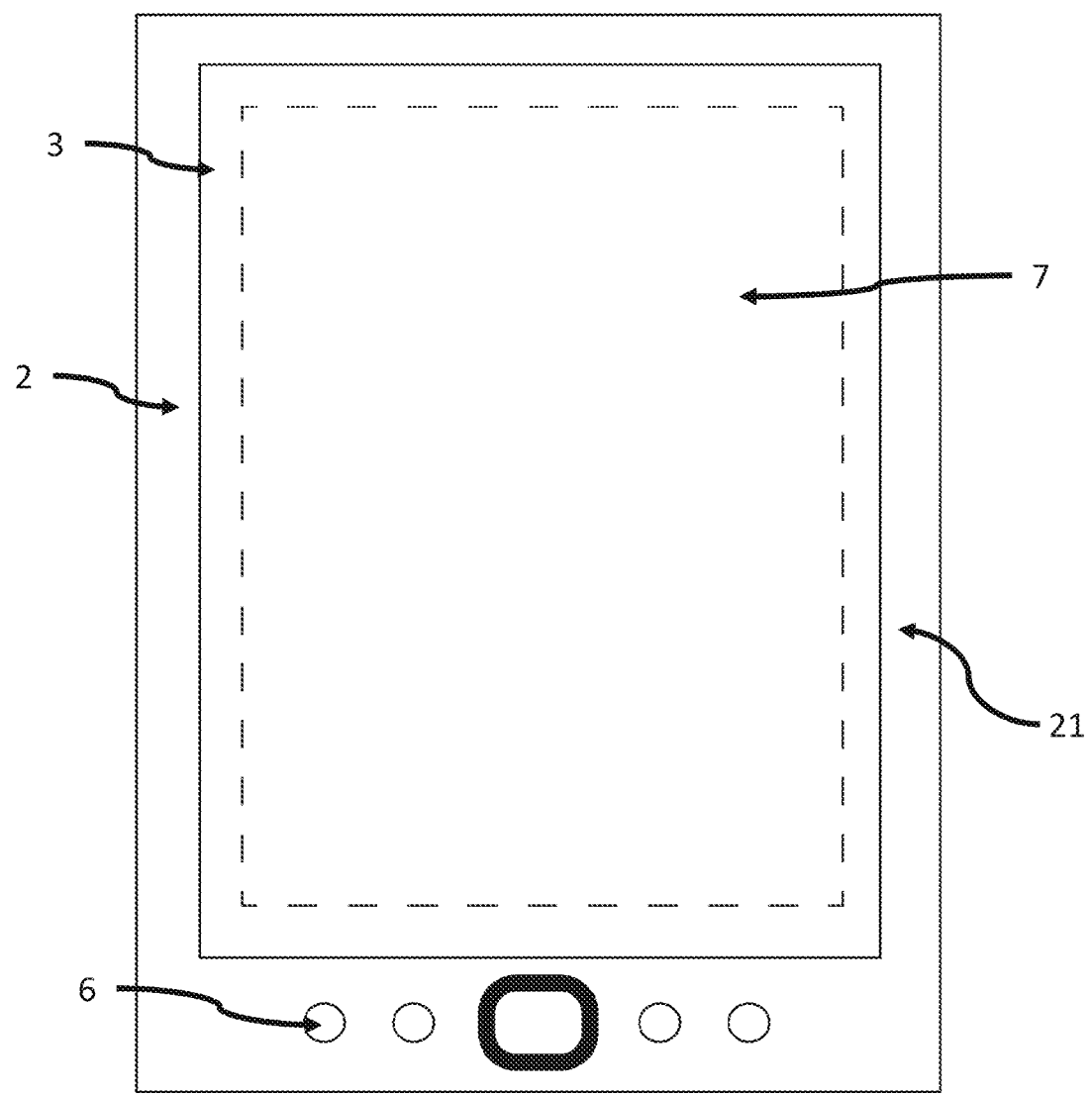
FIG. 2 is a front view of one embodiment of an exemplary dedicated e-ink e-reader without a keyboard.
Figure 3:
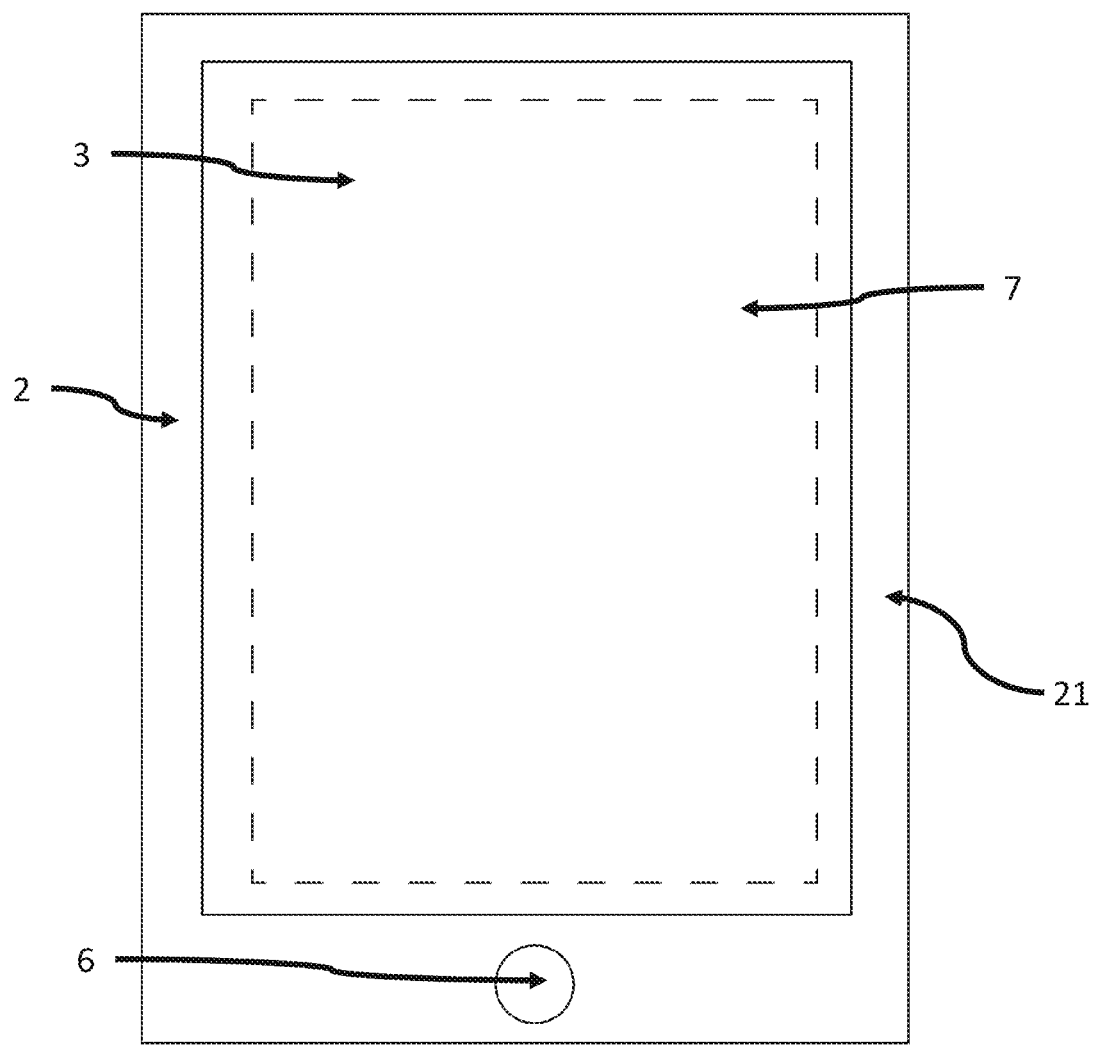
FIG. 3 is a front view of one embodiment of an exemplary computer tablet running e-reader software.
Figure 4:
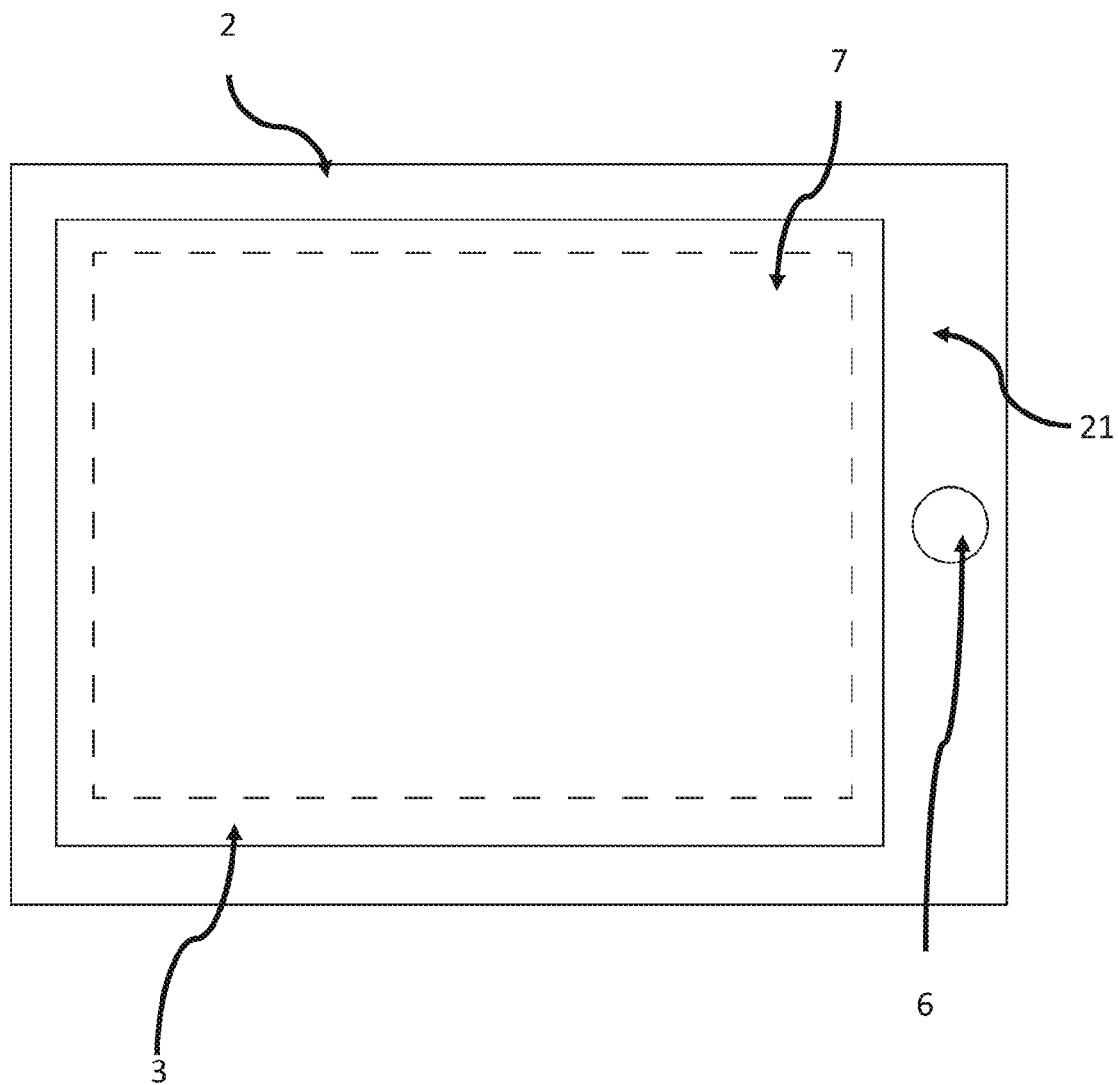
FIG. 4 is another front view of one embodiment of the exemplary computer tablet running e-reader software.

The dedicated e-reader device 2 in FIG. 2, and the computer tablets 2 illustrated in FIGS. 3 and 4, all have input buttons 6 that allow a user to further interact with the e-reader devices 2. The e-reader devices 2 of FIGS. 2-4 also contain touch display screens 3, in which a user may interact with the display screen 3 with one or more touch gestures associated with one or more corresponding operations. On these touch display screens 3, the software applications that allow these e-reader devices 2 to read e-books implement a designated touch sensitive area 7 that turns an e-book page when touched by a user's finger or hand. FIGS. 3 and 4 further illustrate that the software applications that allow these e-reader devices 2 to read e-books may automatically move the page turning touch sensitive area 7 based upon the reading orientation of the e-reader device 2 chosen by the user.

In embodiments of the subject invention, the display screen 3 may be a liquid crystal display (LCD), a light-emitting diode (LED) display, an e-ink display, or a surface-conduction electro-emitter display (SED). Each of the display screens 3 may further include a near field-sensitive (e.g., capacitive), acoustically-sensitive (e.g., surface acoustic wave), photo-sensitive (e.g., infrared), or any other type of touch panel technology that allows the display screen 3 to be used as a touch sensitive input device.

Embodiments of the e-reader accessory device 1 are illustrated in FIGS. 5-18. The accessory device 1 comprises a long narrow structure with a proximal end 8 and a distal end 9. The proximal end 8 of the accessory device 1 comprises a handle 10 operatively coupled with an axially displaceably mounted finger push rod 11. The finger push rod 11 is operatively coupled to a proximal end of a flexible, elongated, mechanical power-transmitting member 12. Proximate to distal end 9, the power-transmitting member 12 is threaded through a threaded connector aperture 13 on a top portion 14 of a clip 15. The distal end 9 of the power-transmitting member 12 comprises a small end effector 16.

In one embodiment of the subject invention, the end effector 16 may be coated with of soft, frictional materials, such as a rubber or soft plastic, to improve actuation of the end effector 16 and to prevent scratching of the page turning button 5. In a further embodiment of the subject invention, the end effector 16 may be a conductive rubber contact pad button, a capacitive stylus end, a conductive metal mesh, a conductive sponge, a conductive rubber cording, or a metal disk for engaging the touch sensitive area 7 of the touch sensitive display screen 3 that turns an e-book page when touched.

Figure 15:
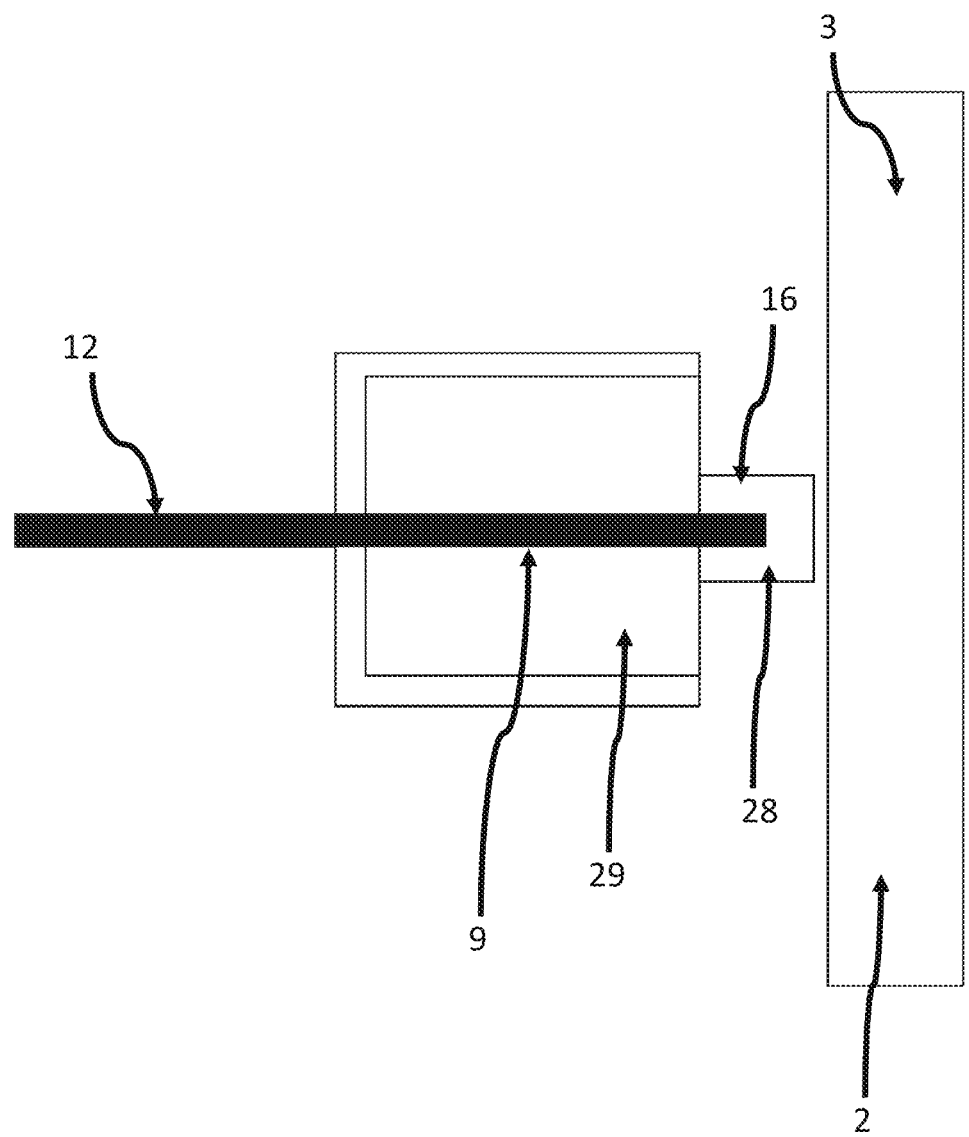
FIG. 15 is a side view of one embodiment of an e-reader page turning accessory tension clip for attaching to front and back surfaces of an e-reader.
Figure 16:
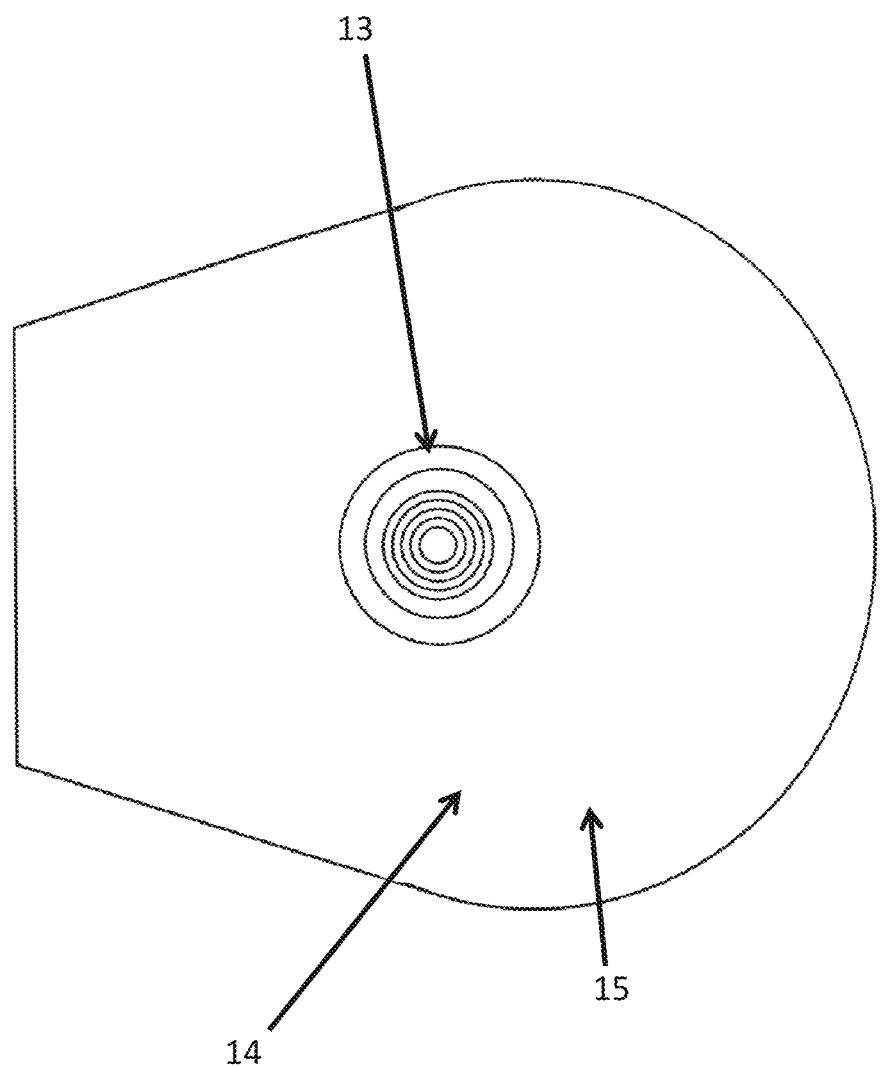
FIG. 16 is a side view of one embodiment of the e-reader page turning accessory conductive stylus distal end for engaging the touch sensitive area of a display screen.

As illustrated in FIG. 15, the end effector 16 may be a conductive rubber contact pad button 28 for contacting the page turning touch sensitive area 7 on the screen 3 of the e-reader device 2. This power-transmitting member 12 may be surrounded by rubber cording 29 as it operatively connects to the conductive rubber contact pad button 28 at the distal end 9.

The power-transmitting member 12 may comprise a flexible coil metal spring, or tubing surrounding an internal spring-loaded annular wire for actuating the end effector 16. The power transmitting member 12 and the end effector 16 are actuatable by direct finger pressure upon the first push rod 11.

The clip 15 on the distal end 9 of the e-reader accessory device 1 comprises a top portion 14 with a bottom surface 17 and a bottom portion 18 with a top surface 19.

Figure 9:
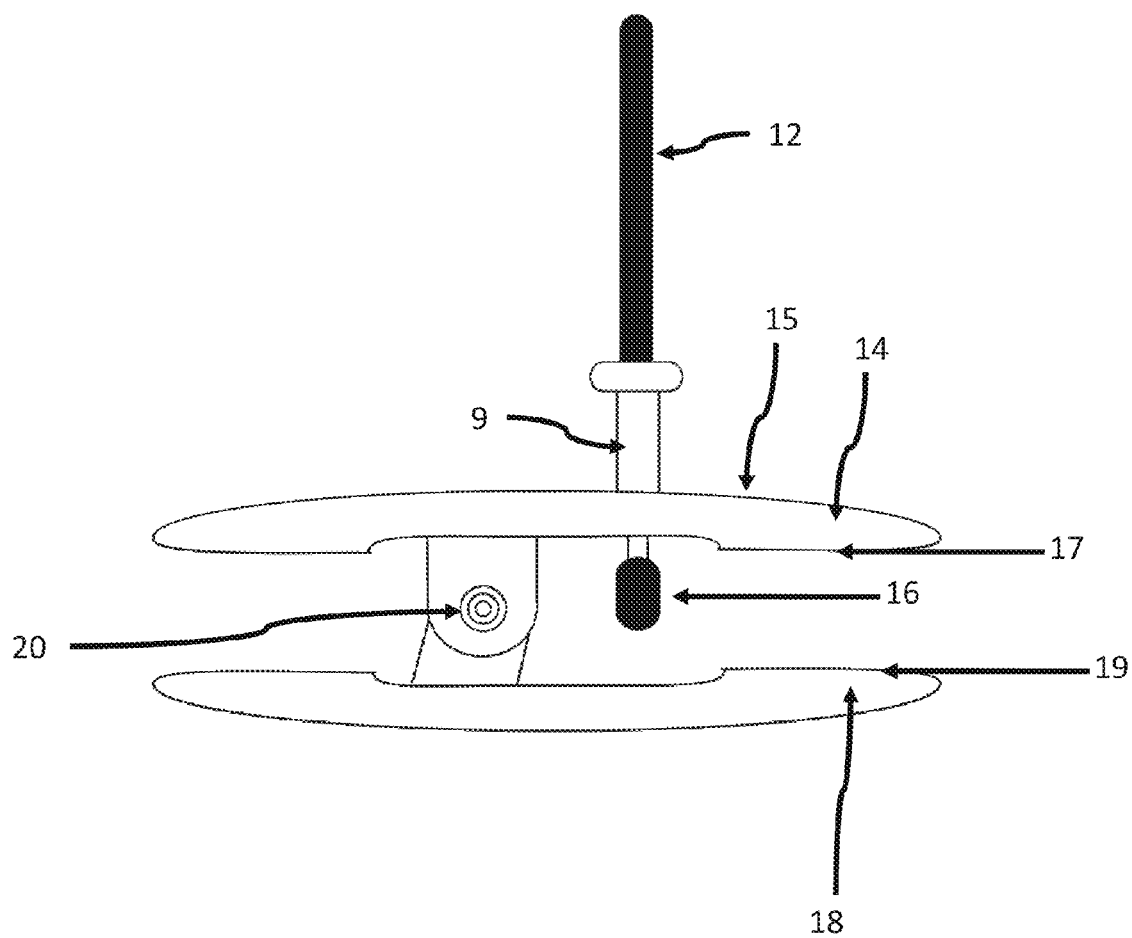
FIG. 9 is a side view of one embodiment of the e-reader page turning accessory with a spring-loaded clip for attaching to front periphery of an e-reader and a stylus distal end for engaging the touch sensitive area of a display screen.
Figure 10:
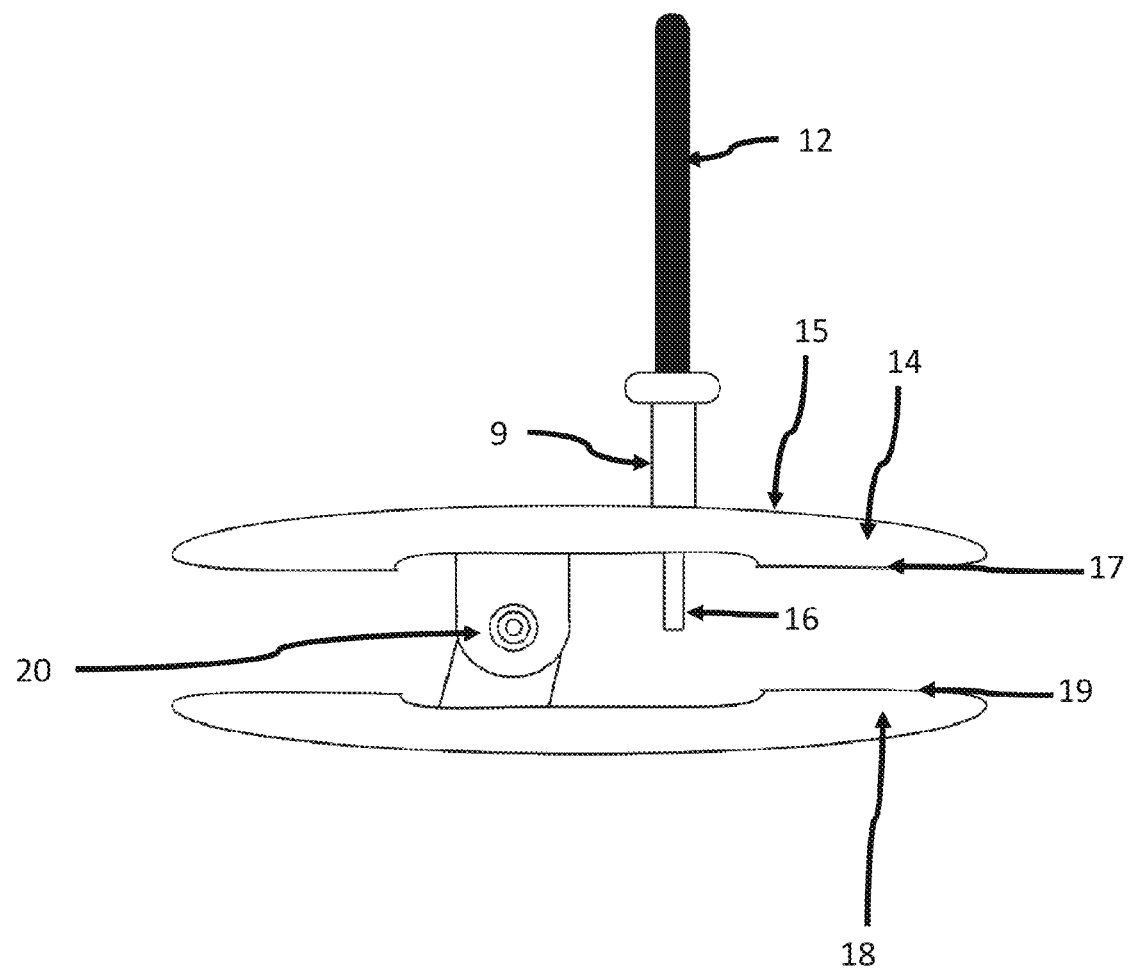
FIG. 10 is a side view of one embodiment of the e-reader page turning accessory with a spring-loaded clip for attaching to front periphery of an e-reader and a soft tip distal end for engaging the page turning button on the e-reader.
Figure 11:
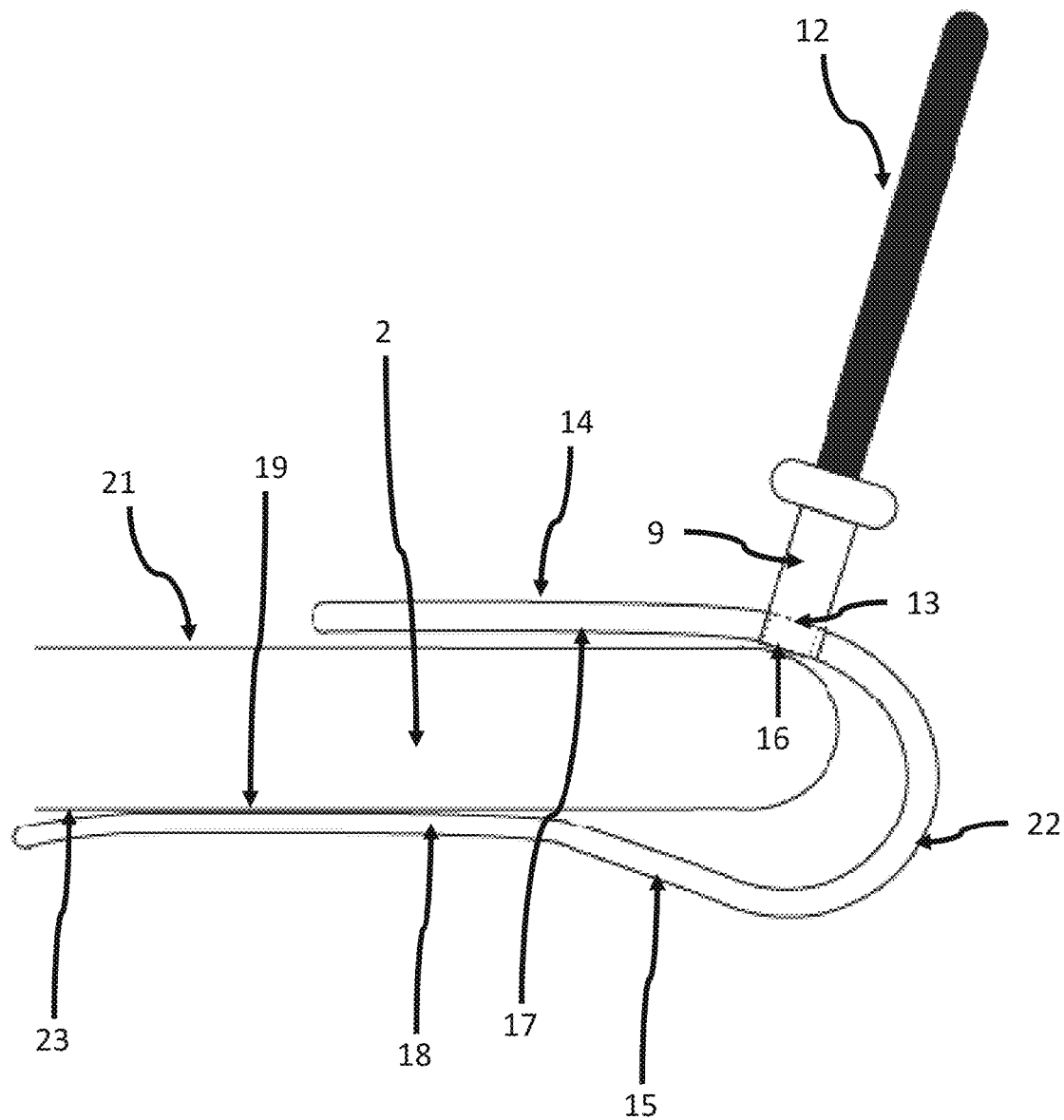
FIG. 11 is a side view of one embodiment of an e-reader page turning accessory tension clip for attaching to front and back surfaces of an e-reader.
Figure 12:
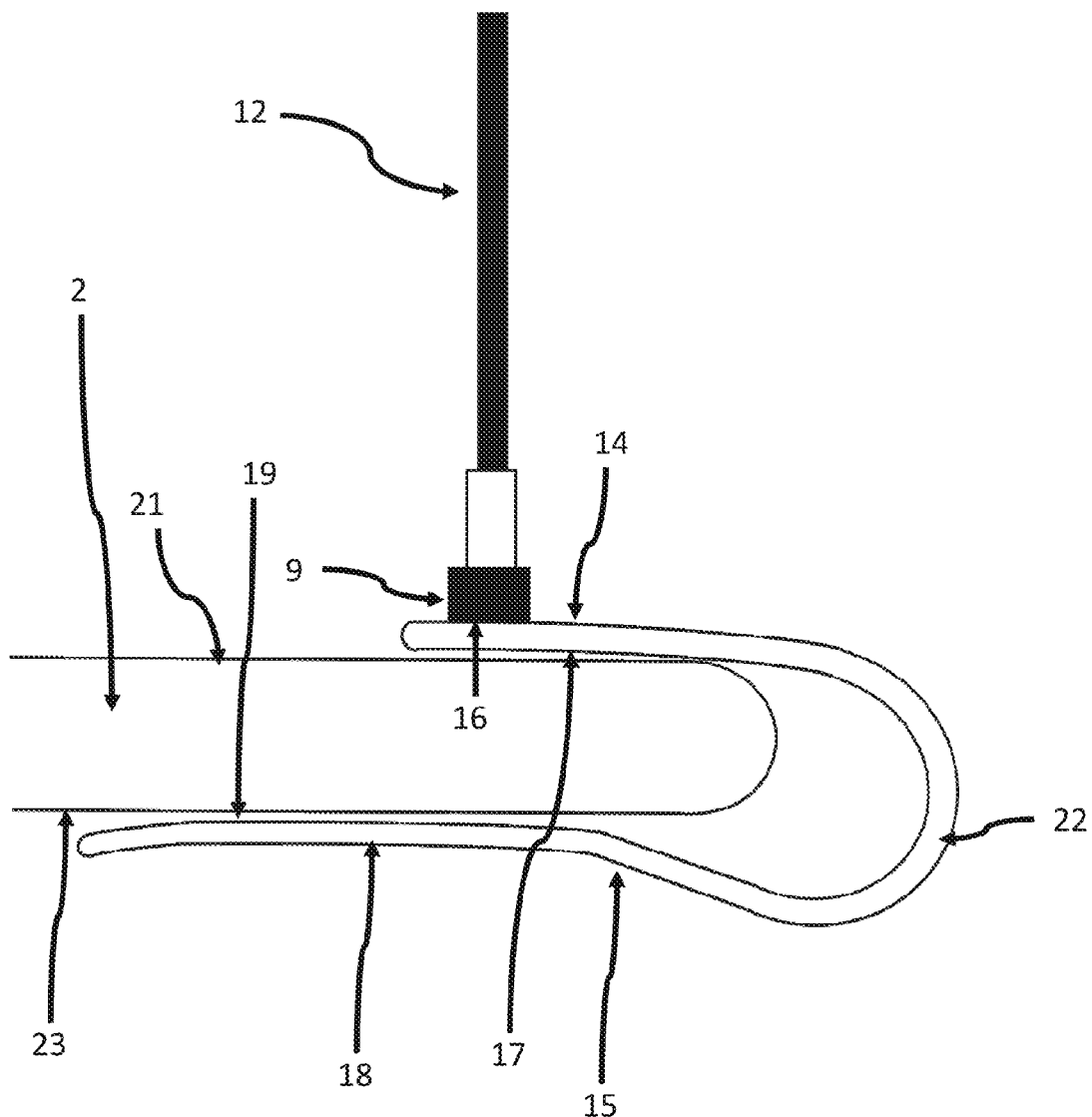
FIG. 12 is a side view of another embodiment of an e-reader page turning accessory tension clip for attaching to front and back surfaces of an e-reader.
Figure 13:
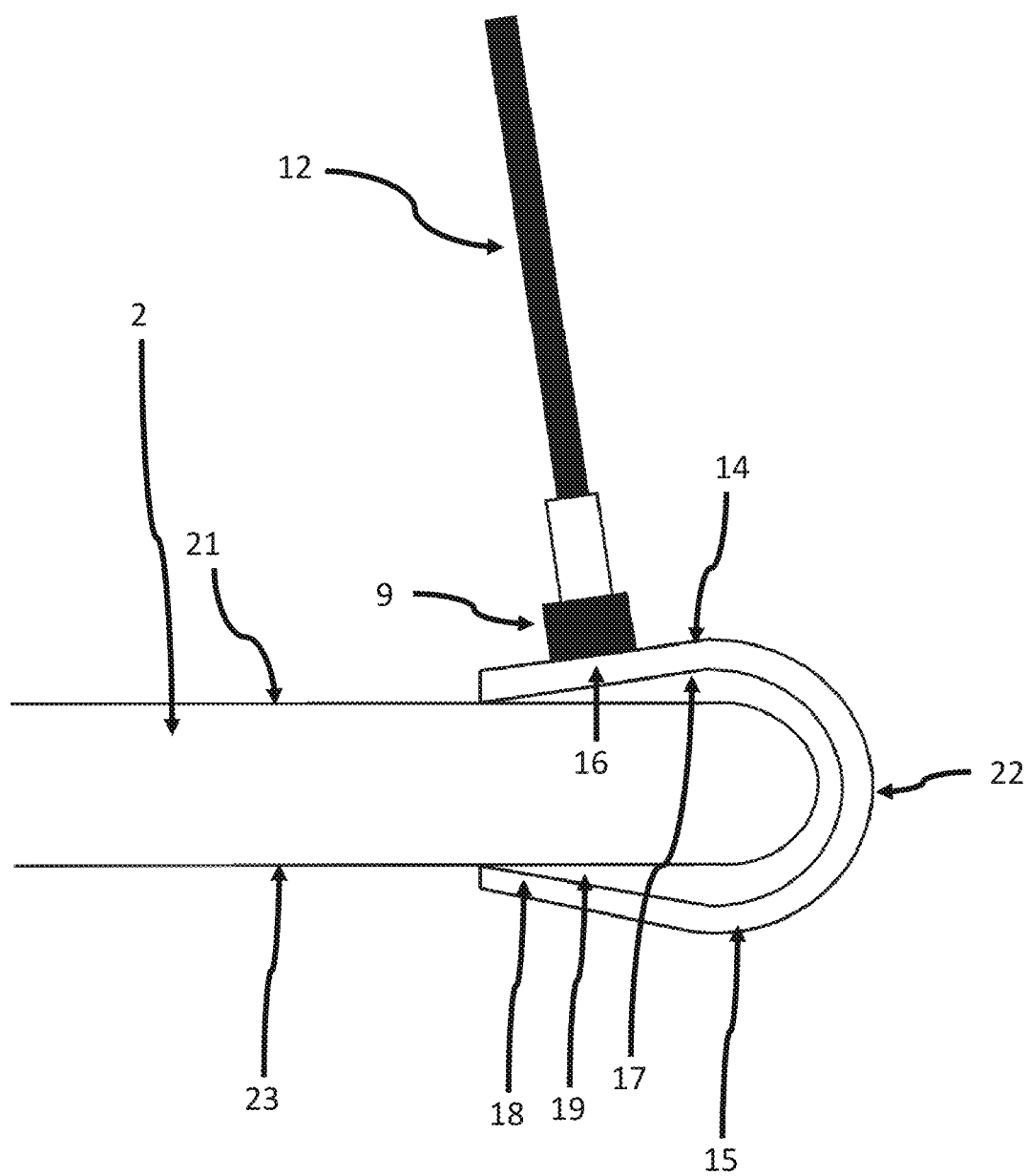
FIG. 13 is a side view of another embodiment of an e-reader page turning accessory tension clip for attaching to front and back surfaces of an e-reader.
Figure 14:
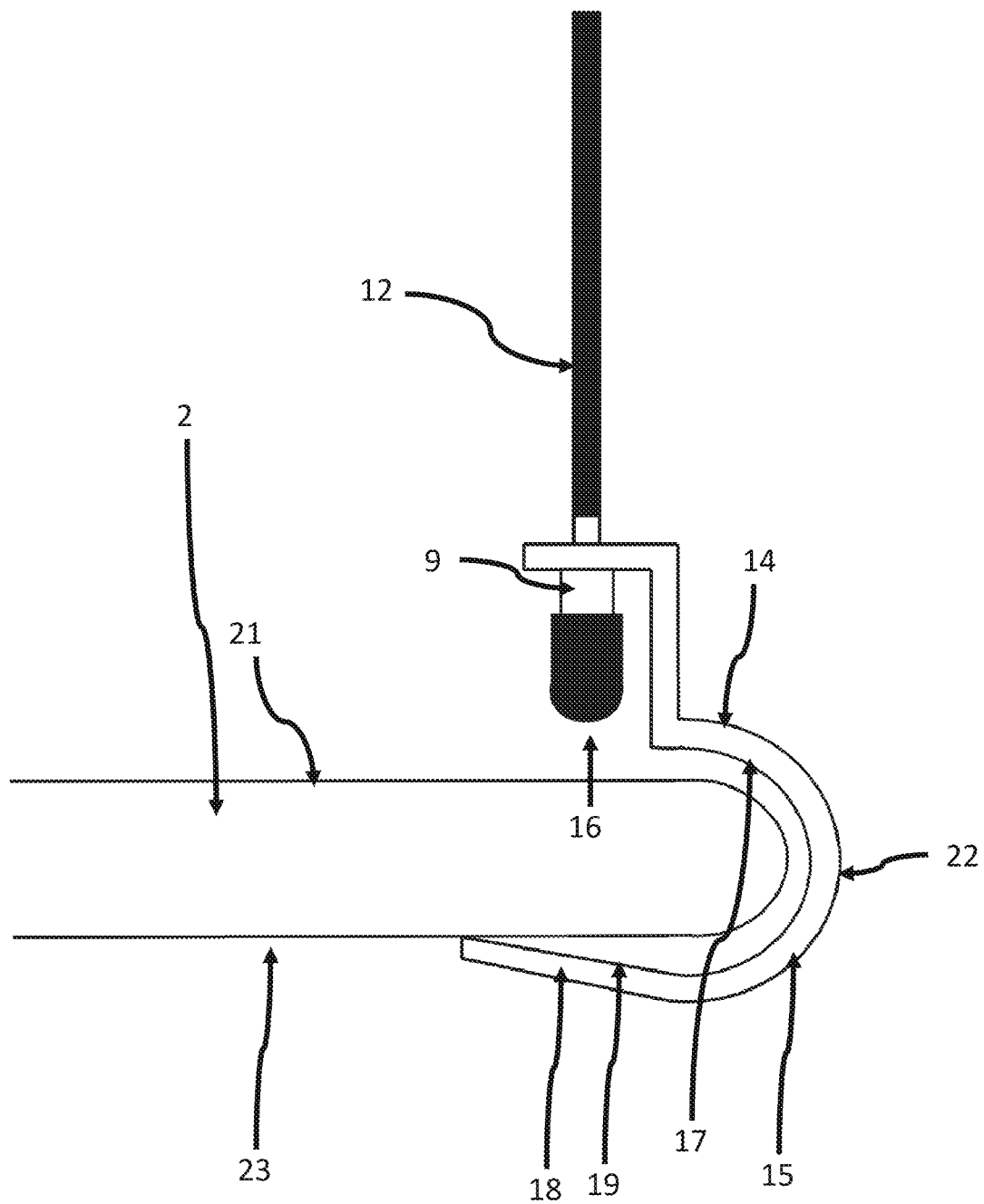
FIG. 14 is a side view of another embodiment of an e-reader page turning accessory tension clip for attaching to front and back surfaces of an e-reader.

As illustrated in FIGS. 9 and 10, the clip 15 may comprise a detachable spring-loaded clip with a spring loaded rotatable connection pivot 20 that provides opposing rotatable forces on the top portion 14 and the bottom portion 18 of the clip 15. These opposing rotatable forces compress and frictionally engage the bottom surface 17 of the top portion 14 with a front periphery surface 21 of the e-reader device 2, and the top surface 19 of the bottom portion 18 with a back surface (not shown) of the e-reader device 2. In embodiments of the subject invention these opposing rotatable forces are strong enough to maintain the clip 15 engaged with the e-reader device 2 with little to no movement, but weak enough to prevent any scratching, cracks, or other damage to the front periphery surface 21 or the display screen 2 of the e-reader device 2.

As illustrated in FIGS. 11-14, the clip 15 may comprise a detachable tension clip with a tension pivot 22 that provides opposing rotatable forces on the top portion 14 and the bottom portion 18 of the clip 15. These opposing rotatable forces compress and frictionally engage the bottom surface 17 of the top portion 14 with a front periphery surface 21 of the e-reader device 2, and the top surface 19 of the bottom portion 18 with a back surface 23 of the e-reader device 2. In embodiments of the subject invention these opposing rotatable forces are strong enough to maintain the clip 15 engaged with the e-reader device 2 with little to no movement, but weak enough to prevent any scratching, cracks, or other damage to the front periphery surface 21 or the display screen 3 of the e-reader device 2.

Figure 5:
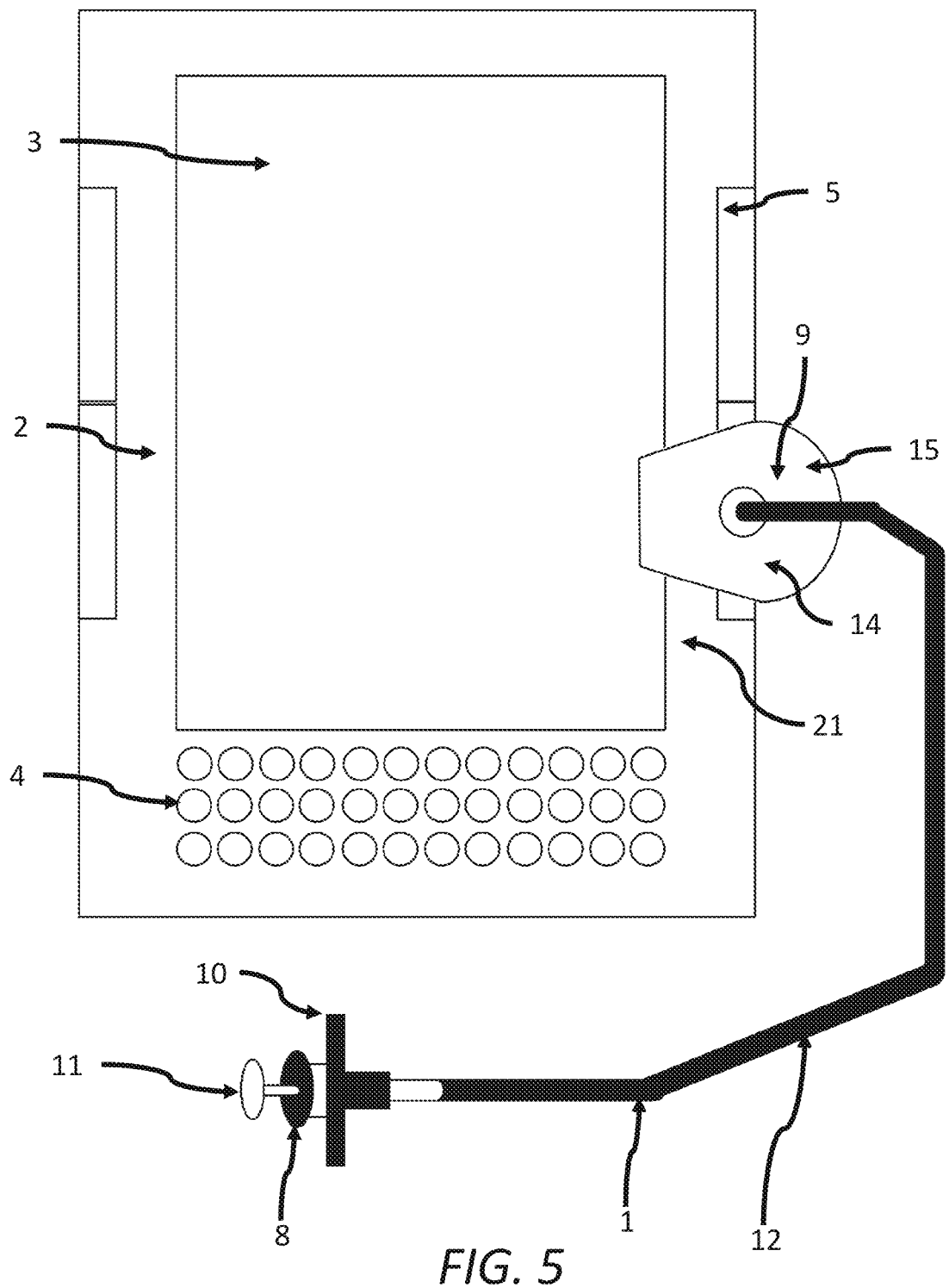
FIG. 5 is a front view of the embodiment of the exemplary dedicated e-ink e-reader with a keyboard with the page turning accessory attached to the front periphery over a page turning button.

As shown in FIG. 5, the top portion 14 of the clip 15 may straddle a physical page-turning button 5 on the e-reader 2. The distal end of the power transmitting member 12 and the end effector 16 must be positioned directly over any portion of the page-turning button 5 on the e-reader 2. It is well within the scope of the invention for the top portion 14 of the clip 15 to contain indicator lines to help position the end effector 16 directly over any portion of the page-turning button 5 on the e-reader 2. In this embodiment, the end effector 16 may be coated with soft, frictional materials, such as a rubber or soft plastic tip, to improve actuation of the end effector 16 and to prevent scratching of the page turning button 5. This rubber tip end effector 16 is illustrated in FIG. 10.

Figure 6:
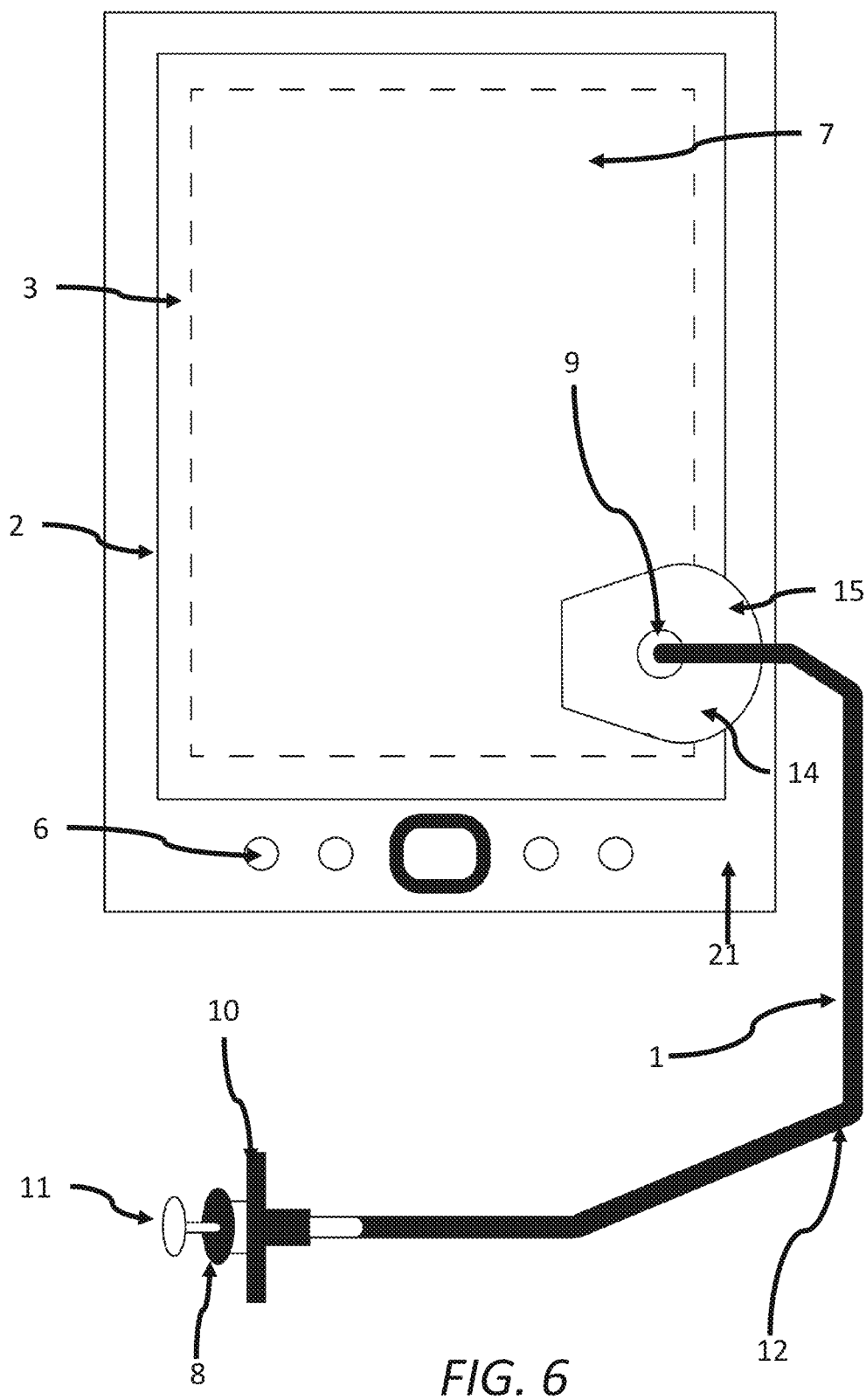
FIG. 6 is a front view of one embodiment of the exemplary dedicated e-ink e-reader without a keyboard with a page turning accessory attached to the front screen over the designated touch sensitive area for turning pages.
Figure 7:
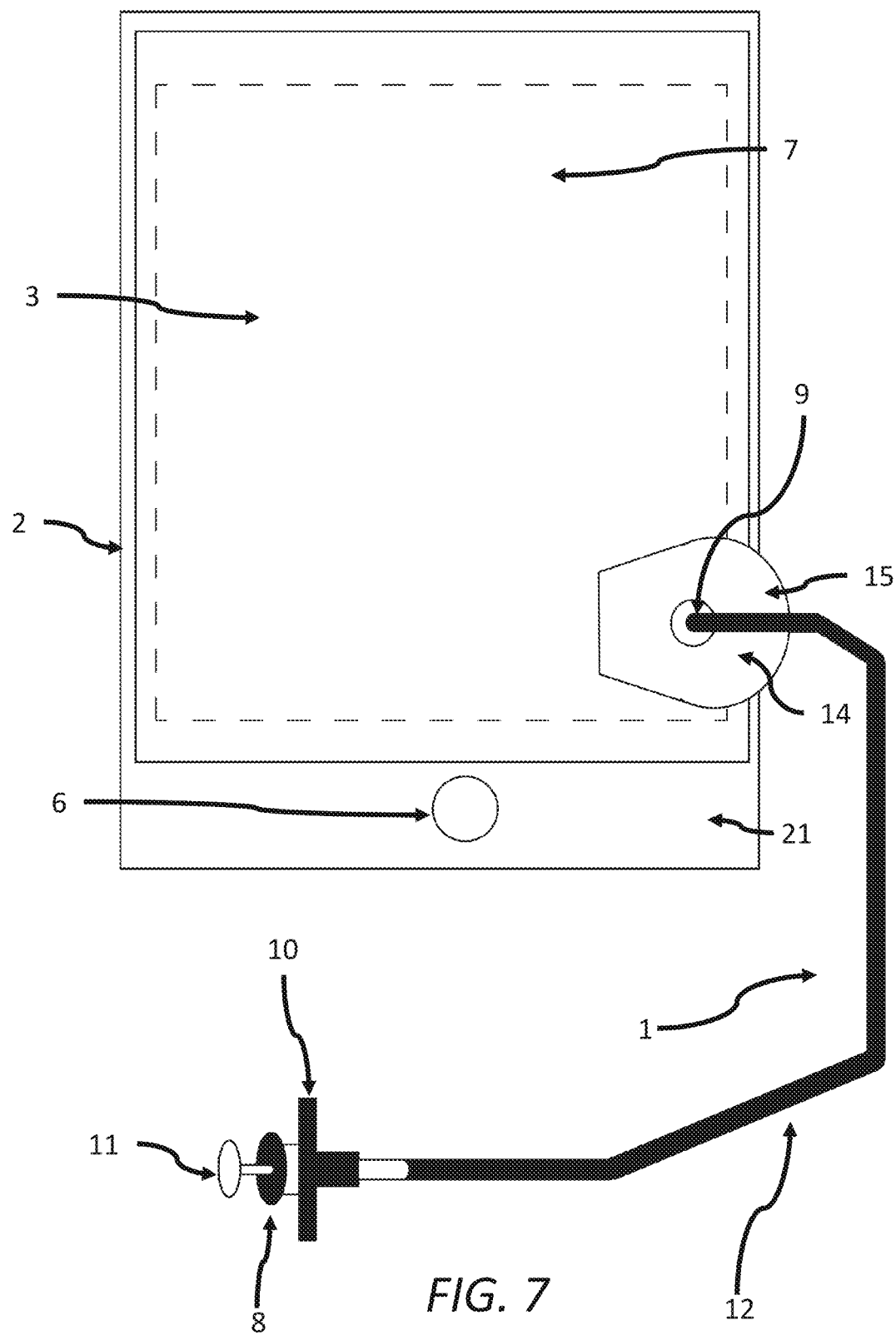
FIG. 7 is a front view of one embodiment of the exemplary computer tablet running e-reader software with a page turning accessory attached to the front screen over the designated touch sensitive area for turning pages.
Figure 8:
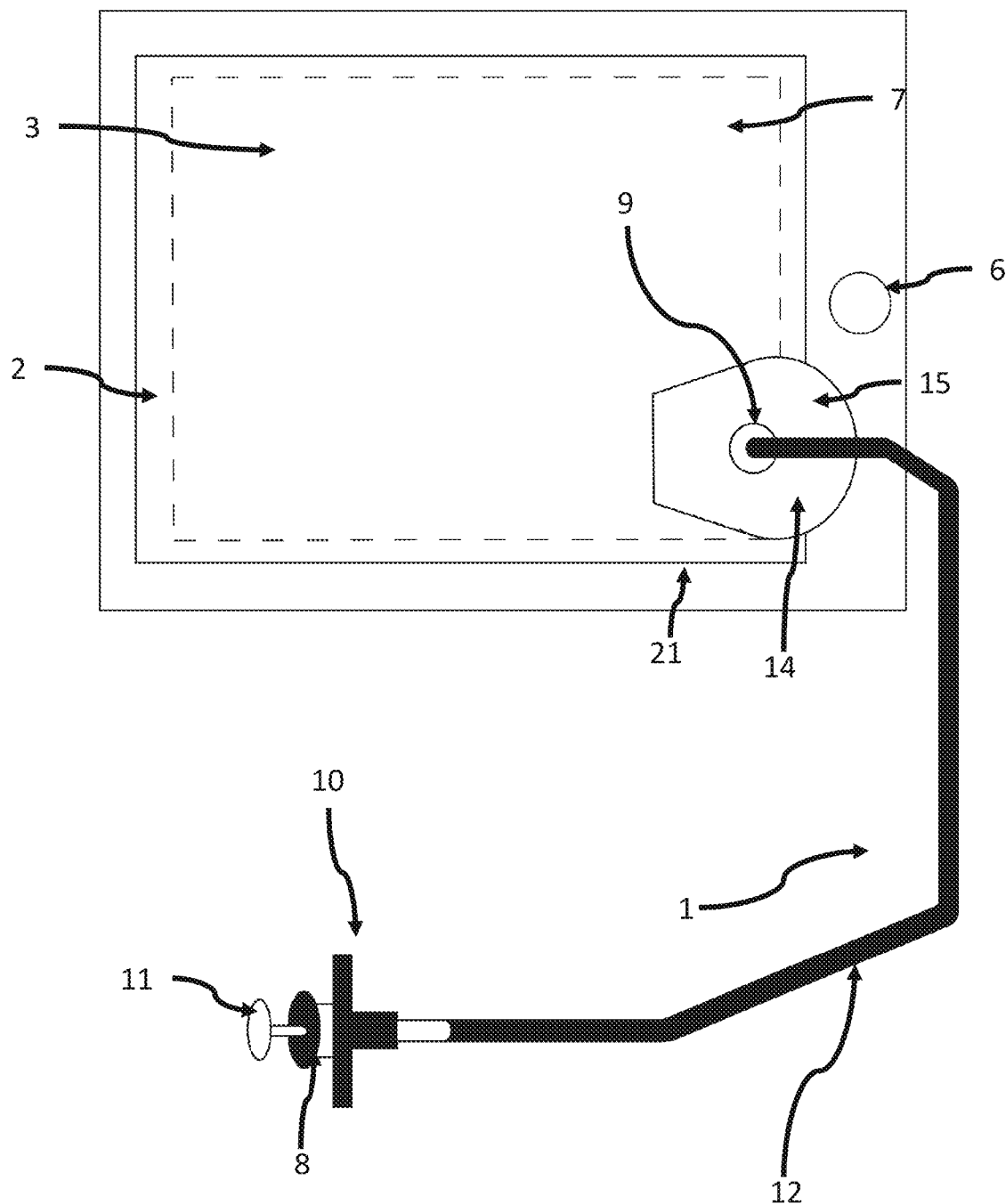
FIG. 8 is another front view of one embodiment of the exemplary computer tablet running e-reader software with a page turning accessory attached to the front screen over the designated touch sensitive area for turning pages.

Alternatively, as shown in FIGS. 6-8, the top portion 14 of the clip 15 may contact the designated touch sensitive area 7 of the touch sensitive display screen 3 that turns an e-book page when touched. In embodiments of the subject invention, the end effector 16 may composed of any small electrically-conductive material, such as a conductive rubber contact pad button, a capacitive stylus end, a conductive metal mesh, a conductive sponge, a conductive rubber cording, or a metal disk that are in direct contact or an integral part of the end of the metal push rod 11. The end effector 16 should be sufficient in diameter (⅛ to ½ inches) and conductivity to actuate touch sensitive area 7 of the touch sensitive display screen 3. This stylus tip end effector 16 is illustrated in FIG. 9.

The e-reader accessory device 1 remote turns pages on the e-reader device 2, by pressing the finger push rod 11 so as to displace the annular wire in the power transmitting member 12 through the threaded connector aperture 13 so as to displace the end effector 16 onto the page-turning button 5 or the touch sensitive area 7. A displacement of ⅛ to ¼ inches of the end effector 16 should be sufficient to cause a displacement depression of the page turning button 5. Excess displacement of the end effector 16 could either damage the e-reader page turning button 5 or cause an undesirable elevation of the power transmitting member 12.

In a further embodiment of the subject invention, the e-reader accessory device 1 may remotely turns pages on the e-reader device 2, by pressing the finger push rod 11 so as to displace the annular wire in the power transmitting member 12 through the threaded connector aperture 13 so as to cause the end effector 16 conductive stylus tip to touch the touch sensitive area 7 on e-reader device 2 so as to cause a change in capacitance of the electric field at the touch point, thereby sending a signal to the e-reader device 2 to actuate a page turn on the e-reader screen.

A further embodiment of the subject invention may include a mechanical stop that would preclude excess displacement of the end effector 16 against the e-reader device page turning button 5 or touch sensitive area 7.

In another embodiment of the subject invention, the e-reader accessory device 1 may remotely turn pages on the e-reader device 2, by pressing the finger push rod 11 so as to activate an electric current in the power transmitting member 12 through the threaded connector aperture 13 so as to complete a circuit with the end effector 16 and the touch sensitive area 7. This completed circuit disrupts the electrical field of the e-reader device touch sensitive area 7, enabling the end effector 16 to turn pages.

In a further embodiment of the subject invention, the finger push rod 11, the handle 10, the power transmitting means 12, the clip 15, and the end effector 16 may all be fabricated as an integral component of the e-reader device 2.

Figure 17:
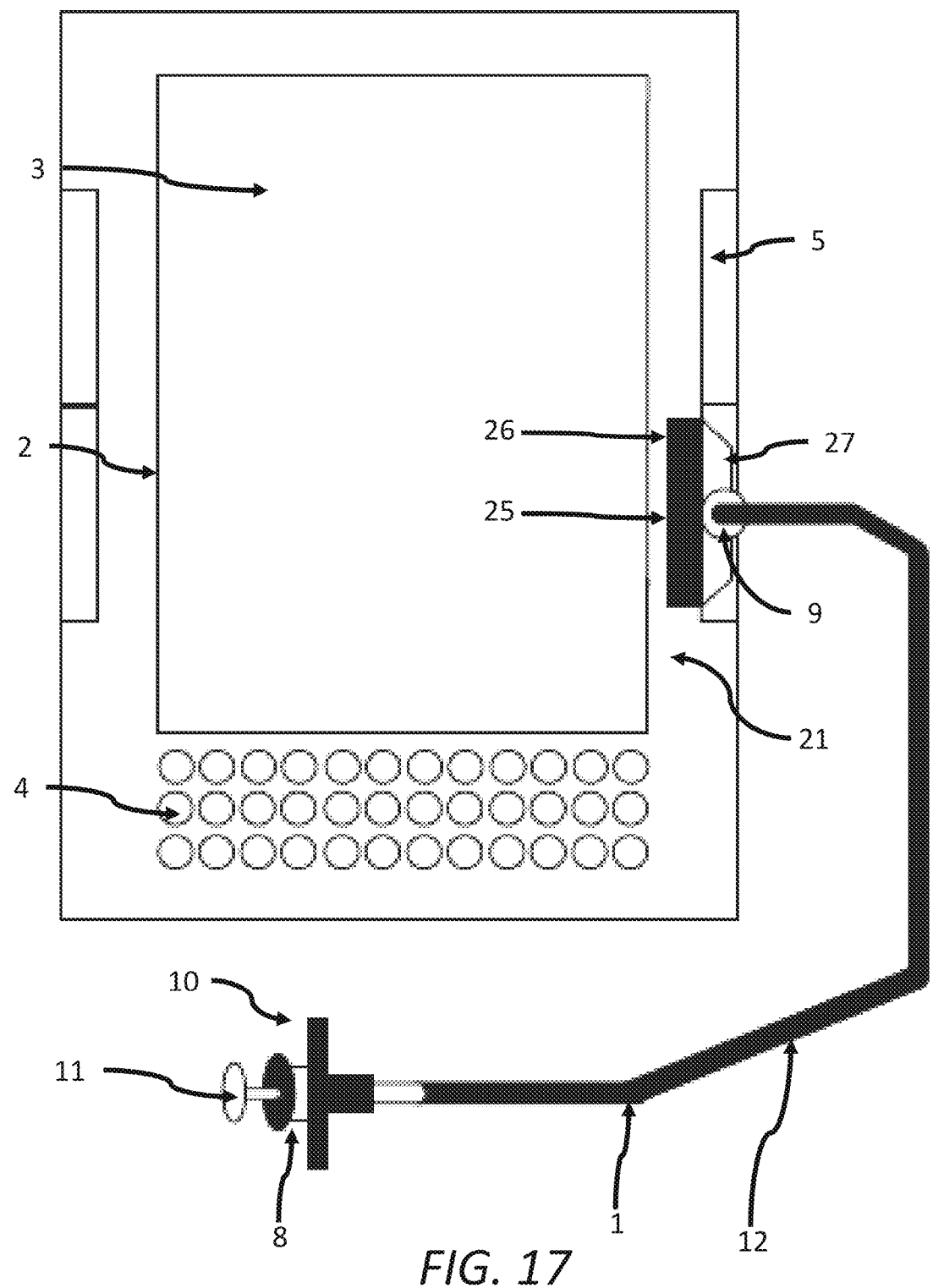
FIG. 17 is a front view of one embodiment of the exemplary dedicated e-ink e-reader with a keyboard with the page turning accessory permanently attached to the front periphery over a page turning button.
Figure 18:
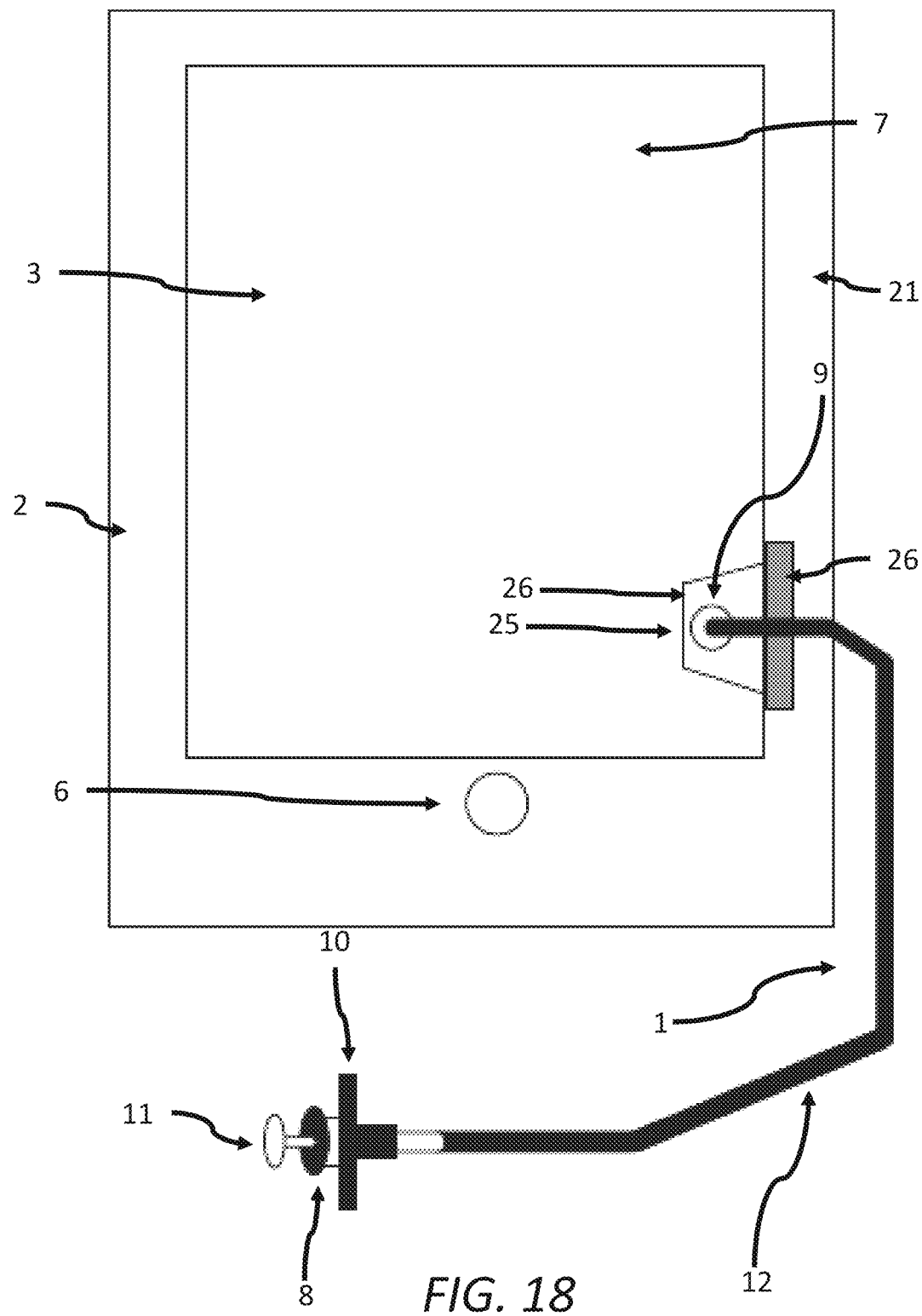
FIG. 18 is a front view of one embodiment of the exemplary computer tablet running e-reader software with a page turning accessory permanently attached to the front screen over the designated touch sensitive area for turning pages.

Other embodiments of the e-reader accessory device 1 are illustrated in FIGS. 17-18. In these embodiments, the accessory device 1 also comprises a long narrow structure with a proximal end 8 and a distal end 9. The proximal end 8 of the accessory device 1 comprises a handle 10 operatively coupled with an axially displaceably mounted finger push rod 11. The finger push rod 11 is operatively coupled to a proximal end of a flexible, elongated, mechanical power-transmitting member 12.

In these embodiments, the distal end 9 of the power-transmitting member 12 is threaded onto a thin platelet type stick-on effector 25. A first portion 26 of the stick-on effector 25 has an applied adhesive attached to its bottom surface and is attached to the front periphery surface 21 of the e-reader device 2. A second portion 27 of said stick-on effector 25 overlaying the page turning button 5 or touch sensitive area 7 is devoid of any adhesives to enable reliable turnings of page turnings. The adhesive backing for the stick-on effector 25 is preferably of a foam-type to adhere to the curved bezel front periphery surface 21 of the e-reader device 2. The stick-on effector 25 is preferably made of lightweight metals or plastics. The power-transmitting member 12 may be detached from the stick-on effector when the e-reader device 2 is not in use.

In embodiments of the subject invention, the e-reader accessory device 1 may be composed of plastics or lightweight metals.

The many aspects and benefits of the invention are apparent from the detailed description, and thus, it is intended for the following claims to cover such aspects and benefits of the invention, which fall within the scope, and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. An e-reader accessory device for use on an e-reader of any size, that allows a user to actuate the e-reader such that the hands or fingers never touch the e-reader device, the accessory device comprising:

an elongated structure with a proximal end and a distal end, wherein the proximal end further comprises a handle operatively coupled with an axially displaceably mounted finger push rod, wherein the finger push rod is operatively coupled to a flexible, elongated, mechanical power-transmitting member, wherein a distal end of the power-transmitting member is attached to an end effector;

a clip comprising a top portion with a bottom surface and a bottom portion with a top surface, wherein the clip is attached about the end effector on the distal end of the power transmitting member, further wherein the clip comprises a spring loaded rotatable connection pivot that provides opposing rotatable forces on the top portion and the bottom portion, wherein these opposing rotatable forces compress and frictionally engage the bottom surface of the top portion with a front periphery surface of the e-reader device over any single actuation button, and the top surface of the bottom portion with a back surface of the e-reader device, wherein the clip engages only one single actuation button anywhere on the front periphery surface of the e-reader device, further wherein the clip engages an e-reader of any size without an e-reader cover;

wherein the e-reader accessory device actuates a chosen function of the e-reader device, from a distance of at least six inches from the e-reader device, by depressing the finger push rod so as to actuate the power-transmitting member through the threaded connector aperture so as to displace the end effector onto the actuation button.

2. The accessory device of claim 1, wherein the opposing rotatable forces are strong enough to maintain the clip frictionally engaged with the e-reader device with substantially no movement, but weak enough to substantially prevent any scratching to the front periphery surface of the e-reader device.

3. The accessory device of claim 1, wherein the end effector has a displacement of $\frac{1}{8}$ to $\frac{1}{4}$ inches.

4. The accessory device of claim 1, wherein the accessory device further comprises a mechanical stop that substantially prevents excess displacement of the end effector against the e-reader device page turning button.

5. The accessory device of claim 1, wherein the finger push rod, the handle, the power transmitting means, the clip, and the end effector comprise integral components of the e-reader device.

6. The accessory device of claim 1, wherein the e-reader device comprises any suitable handheld computing device configured to read e-books.

7. The accessory device of claim 1, wherein the e-reader device display screen comprises a display selected from the group consisting of a liquid crystal display (LCD), a light-emitting diode (LED) display, an e-ink display, and a surface-conduction electro-emitter display (SED).

8. An e-reader accessory device for use on an e-reader of any size, that allows a user to actuate the e-reader such that the hands or fingers never touch the e-reader device, the accessory device comprising:

an elongated structure with a proximal end and a distal end, wherein the proximal end further comprises a handle operatively coupled with an axially displaceably mounted finger push rod, wherein the finger push rod is operatively coupled to a flexible, elongated, mechanical power-transmitting member, wherein a distal end of the power-transmitting member is attached to an end effector;

a clip comprising a top portion with a bottom surface and a bottom portion with a top surface, wherein the clip is attached about the end effector on the distal end of the power transmitting member, further wherein the clip comprises a spring loaded rotatable connection pivot that provides opposing rotatable forces on the top portion and the bottom portion, wherein these opposing rotatable forces compress and frictionally engage the bottom surface of the top portion with a front periphery surface of the e-reader device over any single touch sensitive actuation area on the e-reader display screen, and the top surface of the bottom portion with a back surface of the e-reader device, wherein the clip engages only one touch sensitive actuation area anywhere on the front periphery surface of the e-reader device, further wherein the clip engages an e-reader of any size without an e-reader cover;

wherein the e-reader accessory device actuates a chosen function of the e-reader device, from a distance of at least six inches from the e-reader device, by depressing the finger push rod so as to actuate the power transmitting member so as to cause the end effector to touch the touch sensitive actuation area on the e-reader device so as to cause the conductive end of the end effector on the distal end of the power transmitting member to touch the e-reader screen and alter the capacitance at the touch point, thereby sending a signal to the e-reader to actuate a chosen function on the e-reader screen.

9. The accessory device of claim 8, wherein the end effector comprises an electrically conductive material selected from the group consisting of a conductive rubber contact pad button, a capacitive stylus end, a conductive metal mesh, a conductive sponge, a conductive rubber cording, or a metal disk.

10. The accessory device of claim 8, wherein the end effector comprises a conductive tip that does not scratch the e-reader display screen.

11. The accessory device of claim 8, wherein the opposing rotatable forces are strong enough to maintain the clip frictionally engaged with the e-reader device with substantially no movement, but weak enough to substantially prevent any scratching to the front periphery surface of the e-reader device.

12. The accessory device of claim 8, wherein the finger push rod, the handle, the power transmitting means, the clip, and the end effector comprise integral components of the e-reader device.

13. The accessory device of claim 8, wherein the e-reader device comprises any suitable handheld computing device configured to read e-books.

14. The accessory device of claim 8, wherein the e-reader device display screen comprises a display selected from the group consisting of a liquid crystal display (LCD), a light-emitting diode (LED) display, an e-ink display, and a surface-conduction electro-emitter display (SED).

15. The accessory device of claim 8, wherein the touch sensitive actuation area comprises a touch sensitive display selected from the group consisting of a near field-sensitive, a capacitive, an acoustically-sensitive, and a photo-sensitive display.

* * * * *